United States Patent [19]

Tomimoto et al.

[11] 4,306,247

[45] Dec. 15, 1981

[54] COLOR SIGNAL CONTROLLING APPARATUS

[75] Inventors: Tetsuo Tomimoto, Osaka; Yoshitomi Nagaoka, Neyagawa, both of Japan

[73] Assignee: Matsushita Electric Industrial Co., Ltd., Osaka, Japan

[21] Appl. No.: 3,773

[22] Filed: Jan. 15, 1979

[30] Foreign Application Priority Data

Jan. 20, 1978 [JP] Japan .................................. 53-5383

[51] Int. Cl.³ .................................................. H04N 9/535
[52] U.S. Cl. ...................................... 358/28; 358/21 V; 358/27
[58] Field of Search ............................. 358/21 V, 27, 28

[56] References Cited

U.S. PATENT DOCUMENTS

| | | | |
|---|---|---|---|
| 3,654,384 | 4/1972 | Kresock | 358/28 |
| 3,882,534 | 5/1975 | Srivastova | 358/28 |
| 3,950,780 | 4/1976 | Freestone | 358/28 |
| 4,096,515 | 6/1978 | Brown et al. | 358/28 |

*Primary Examiner*—John C. Martin
*Attorney, Agent, or Firm*—Wenderoth, Lind & Ponack

[57] ABSTRACT

A color signal controlling apparatus for controlling a color signal in a color television receiver. The apparatus has a color signal modifier for modifying a color signal; and a color signal stabilizer supplied with a color signal from the color signal modifier for detecting a color reference signal in a vertical blanking period and for stabilizing the color signal with reference to the color reference signal. The apparatus further has a switching circuit for supplying a switching signal in the vertical blanking period to the color signal modifier. The switching signal prohibits the color signal modifier from modifying the color reference signal to keep the desired operation of the color signal stabilizer.

2 Claims, 4 Drawing Figures

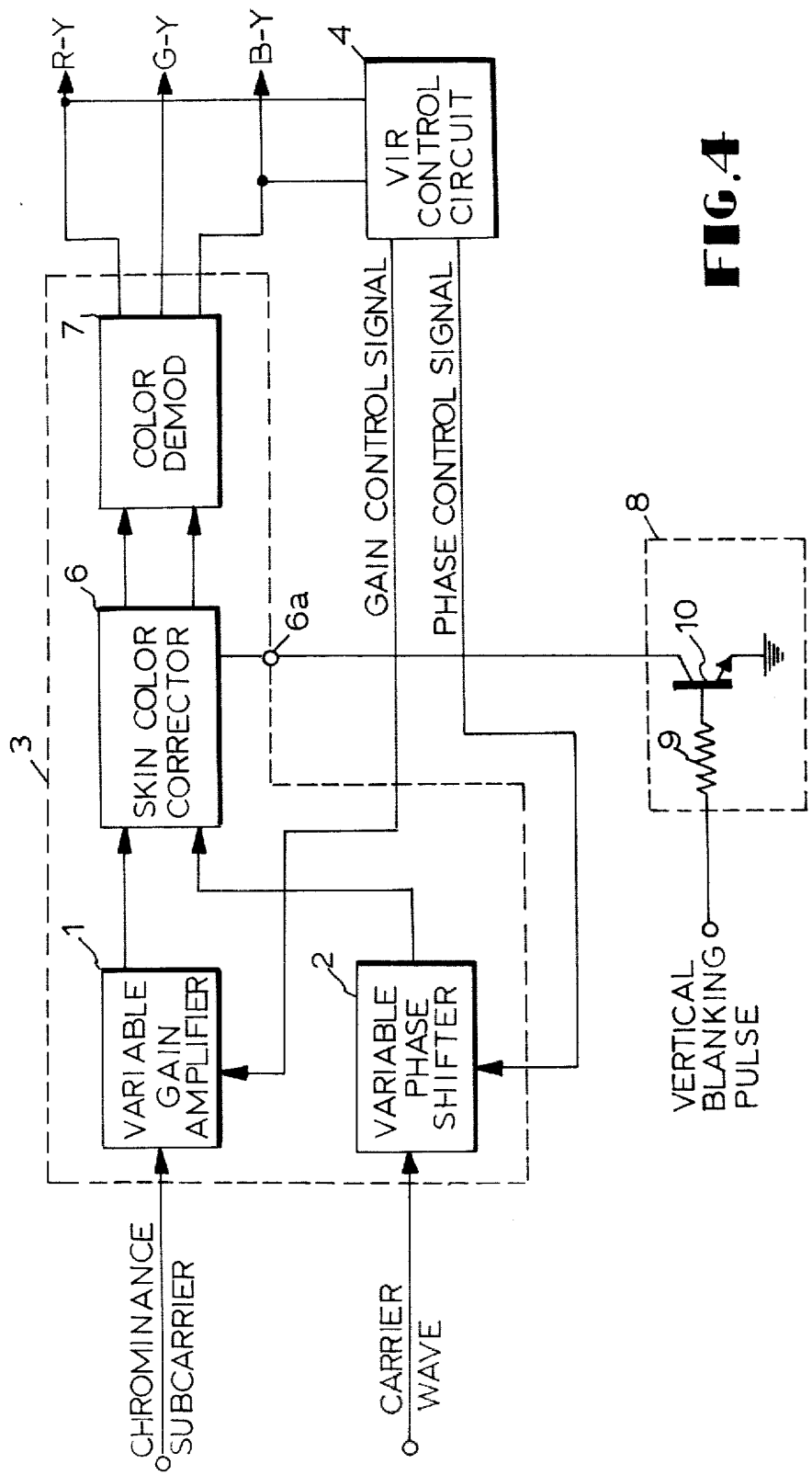

COLOR SIGNAL CONTROLLING APPARATUS

This invention relates to a color signal controlling apparatus for a color television receiver, more particularly to automatic color control circuitry which controls hue and saturation of a displayed color relative to a color reference signal on a horizontal scanning line within a vertical blanking period.

In accordance with an October 1975 ruling by the U.S. Federal Communications Commission, in TV broadcasting, the VIR (Vertical Interval Reference) signal may be transmitted on scanning line 19 of each of the two interlaced fields. The chrominance signal is corrected automatically by a VIR control circuit in TV receivers with reference to the VIR signal transmitted from a TV station. This is described in detail, for example, in the articles entitled "GE's Broadcast-Controlled Color System Part 1 and Part 2" in the U.S. magazine "Electronic Technician/Dealer", August and September, 1976. The VIR control circuit is supplied with color-difference signals and produces a control signal for controlling chrominance signal level and phase, so that a color-difference signal level corresponding to the VIR signal stays at a certain level.

The chrominance signal can also be corrected by other automatic control circuits such as described in detail in an article written by L. A. Harwood entitled "An Integrated One-Chip Processor for Color TV Receivers" in the U.S. magazine "IEEE Transaction on Consumer Electronics", August, 1977. This circuit decreases deviation of displayed skin colors by pulling the phase of neighboring colors into the skin phase.

Although these two automatic control circuits as set forth above have advantages, respectively, they cannot work at the same time in a television receiver for the following reason. The Harwood circuit changes color signal phase near the intended skin phase. If the circuit has a wide pull-in range covering the phase of the VIR chrominance reference, it shifts the reference phase of the VIR signal to cause phase error of the VIR control circuit.

It is an object of this inventin to provide a color signal controlling apparatus which controls a color signal with reference to a color reference signal like VIR, and also permits another color processing circuit that will affect the color reference signal in the vertical blanking period.

This object is achieved according to this invention by providing color signal controlling apparatus, which comprises: a color signal modifying means for modifying a color signal; a color signal stabilizing means supplied with the color signal from the color signal modifying means for detecting a color reference signal in a vertical blanking period and for stabilizing the color signal with reference to the color reference signal; and a switching means for supplying a switching signal to the color signal modifying means in the vertical blanking period for prohibiting the color signal modifying means from modifying the color reference signal.

Details of this invention will be apparent from the following description taken in connection with the accompanying drawings, in which;

FIG. 4 is a schematic block diagram of an embodiment of this invention.

Figure 1:
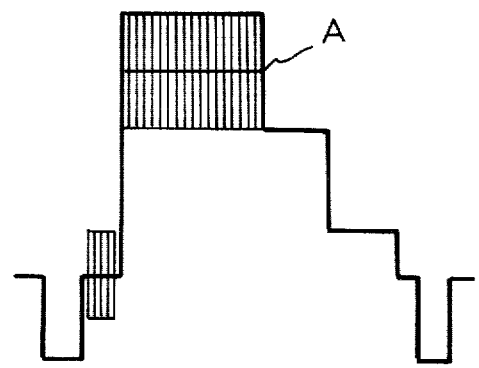
FIG. 1 is a diagram showing a waveform of a VIRS (Vertical Interval Reference Signal) on the 19th scanning line of a composite video signal.

FIG. 1 shows a waveform of a VIRS (Vertical Interval Reference Signal) which is on the 19th scanning line in a vertical blanking period. A chrominance subcarrier A in FIG. 1 has a phase of 180° and an amplitude of 20 IRE units to give the color reference. It is well known that a receiver can be equipped with a VIR control circuit for stabilizing the phase and amplitude of a chrominance signal with reference to the color reference in the VIRS.

However, a color signal stabilizing means like a VIR control circuit does not work well in a receiver that is equipped with another color signal modifying means which would affect the color reference in its operation. A system, as an example, having a VIR control circuit and a skin color corrector will be discussed below.

Figure 2:
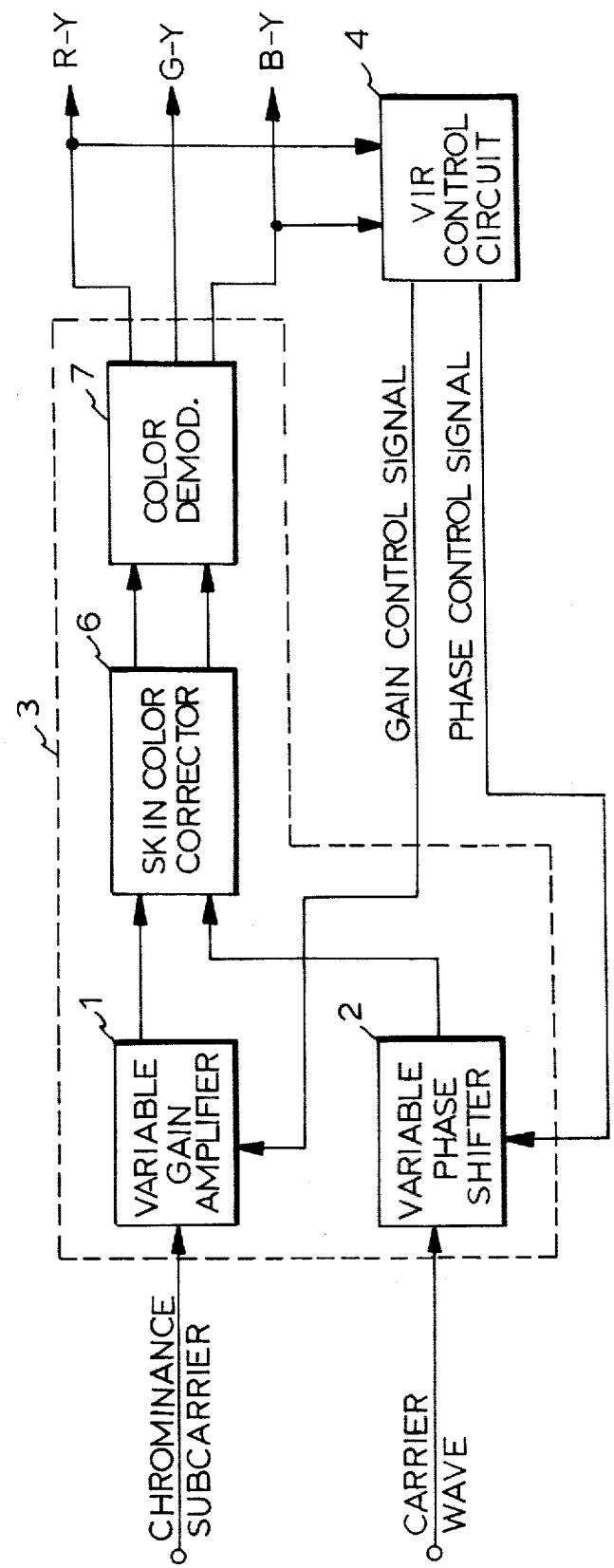
FIG. 2 is a schematic block diagram showing a color signal processing stage in a color television receiver equipped with a VIR control circuit and a skin color corrector.

FIG. 2 shows a schematic block diagram of a color signal processing stage in a color television receiver equipped with a VIR control circuit and a skin color corrector. Referring to FIG. 2, a chrominance subcarrier is applied to a variable gain amplifier 1 and is thereby amplified. The amplified chrominance subcarrier is applied to a skin color corrector 6. A variable phase shifter 2 produces a phase shift in an input carrier wave and transfers the phase-shifted wave to the skin color corrector. The gain of the variable gain amplifier 1 and the phase of the variable phase shifter 2 are controlled by DC signals.

The skin color corrector 6 detects the phase of the chrominance subcarrier around the skin phase and pulls it into the skin phase. The chrominance subcarrier and the carrier wave developed by the skin color corrector 6 are fed to a color demodulator 7 and are demodulated therein into three color difference signals, R-Y, G-Y and B-Y. The circuits such as the variable gain amplifier 1, the variable phase shifter 2, the skin color corrector 6 and the color demodulator 7 may be contained in a one-chip integrated circuit 3 like, for example, CA3137 manufactured by RCA.

Figure 3:
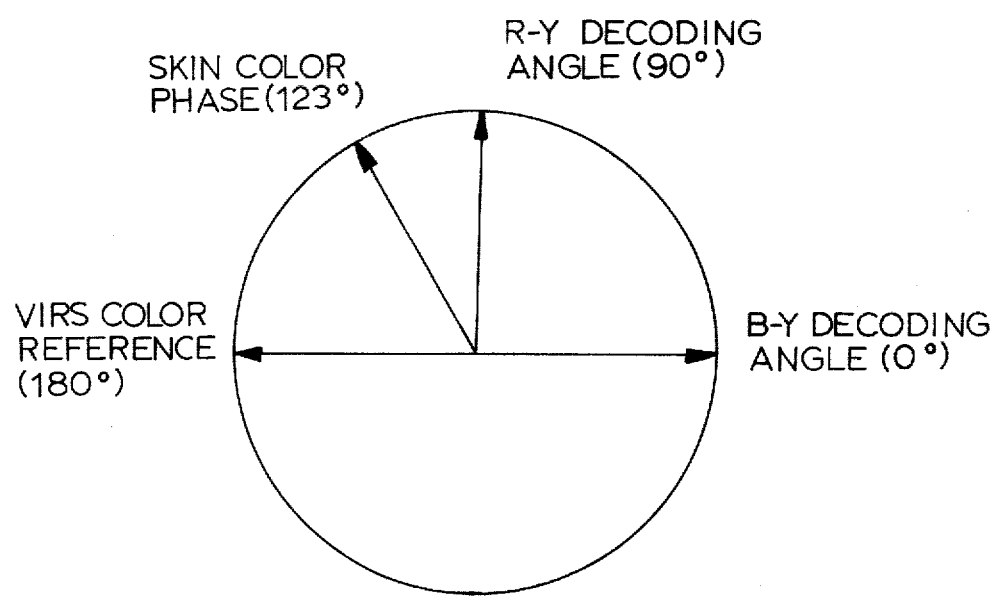
FIG. 3 is a vector diagram explaining the performance of the skin color corrector.

FIG. 3 shows a vector chart explaining the performance of the skin color corrector 6. The chrominance subcarrier near the skin color signal is pulled toward the skin color phase, and deviations of skin colors in a TV picture are decreased. R-Y and B-Y signals are supplied to the VIR control circuit 4 which may be AN5330 manufactured by Matsushita Electronics Corporation of Japan. The VIR control circuit 4 detects the R-Y and B-Y signal levels which correspond to the color reference signal as shown by A in FIG. 1. The R-Y signal obtained from the color reference signal should be zero, because the R-Y decoding angle (90°) differs by 90° from the phase of the color reference signal (180°). If the decoded R-Y signal from the color reference has some level, the VIR control circuit 4 transforms that level to a phase control signal and supplies it to the variable phase shifter 2. Consequently, the phase of the color reference is shifted to 180° and the R-Y signal becomes zero.

The B-Y signal, which is decoded by the B-Y demodulator with 0° decoding angle, has a negative value and indicates an amplitude of the color reference signal. If an amplitude error occurs, the VIR control circuit 4 detects an error level of the B-Y signal and feeds back the error signal to the variable gain amplifier 1 to obtain a normal B-Y level at the output terminal of the color demodulator 7.

However, the VIR control circuit 4 and the skin color corrector 6 actually do not work well at the same time in the system as shown in FIG. 2, because the skin color corrector 6, as shown in FIG. 3, shifts the phase of the color reference in VIRS toward the skin phase in its skin color correction, and sends a false color reference to the VIR control circuit 4 which is controlling color signals with reference thereto.

The VIR control circuit 4 corrects total color distortion formed along a TV signal transmission path, and the skin color corrector 6 corrects skin color distortion mainly found at a broadcasting station. Therefore, cooperation of the two kinds of circuits would reproduce an excellent picture with high quality color.

This invention provides a color signal controlling apparatus which can reproduce high quality colors with minimum distortions by allowing the two kinds of means to cooperate with each other, namely a color signal modifying means like the skin color corrector and a color signal stabilizing means like the VIR control circuit.

FIG. 4 shows a schematic block diagram of a color signal processing stage using an embodiment of this invention. In FIG. 4, similar reference numerals as those used in FIG. 2 designate similar elements. Referring to FIG. 4, a vertical blanking pulse is applied to a switching means 8. The switching means 8 consists of a resistor 9 and a transistor 10. The vertical blanking pulse is applied to the base of the transistor 10 through the resistor 9. The emitter of the transistor 10 is connected to the ground, and the collector of transistor 10 is connected to a terminal 6a of the skin color corrector 6. When the vertical blanking pulse is 'ON', the transistor 10 is conductive and the voltage of the terminal 6a becomes almost zero. The terminal 6a is for switching the operation of the skin color corrector 6. For example, the 3rd pin of the integrated circuit CA3137 set forth above is a terminal that makes the skin color corrector 6 operate when it is supplied with a high level voltage, and disables the corrector 6 when it is supplied with a low level voltage. Therefore, while the vertical blanking pulse is 'ON', the skin color corrector 6 does not work, and the color reference signal in the VIRS keeps a normal phase and amplitude.

The VIR control circuit 4 receives a normal VIRS in the vertical blanking period, and correctly controls the variable gain amplifier 1 and the variable phase shifter 2 with reference thereto. In the picture period, the vertical blanking pulse is 'OFF', and the voltage level of the terminal 6a becomes high so as to make the skin color corrector 6 operate fairly well.

The resistor 9 and the transistor 10 in the switching means may be replaced by a line recognizer for counting the number of horizontal scanning lines and generate, at a certain scanning line, a switching pulse to be supplied to the terminal 6a.

Although the foregoing description its mostly concerned with the VIR control circuit and the skin color corrector, the VIR control circuit can be replaced by other color signal stabilizing means as long as it detects a color reference signal in a vertical blanking period and stabilizes the color signal with reference to said color reference signal; and the skin color corrector may be replaced by other color signal modifying means as long as it affects said color references signal in a vertical blanking period.

This invention having been described in connection with the embodiments shown in the accompanying drawings, it is intended that this invention should not be limited to the details of the description, unless otherwise specified, but should rather be construed broadly within its spirit and scope as set out in the following claims.

What is claimed is:

1. A color signal controlling apparatus for controlling a color signal in a color television receiver, the apparatus comprising:
a color signal modifying means for detecting the phase of the chrominance subcarrier around the skin color phase and for shifting the phase of the chrominance subcarrier to the skin color phase; and a color demodulating means connected to said color signal modifying means for being supplied with the chrominance subcarrier and carrier wave from said color signal modifying means producing color difference signals, the carrier wave having been modified by said color signal modifying means; a color signal stabilizing means connected to said color demodulating means for being supplied with said color difference signals from said color demodulating means and for detecting a color reference signal in a vertical blanking period and for stabilizing said chrominance subcarrier and/or said carrier wave with reference to said color reference signal; and a switching means connected to said color signal modifying means for supplying a switching signal to said color signal modifying means in the vertical blanking period for prohibiting said color signal modifying means from modifying said color reference signal during said vertical blanking period.

2. A color signal controlling apparatus as claimed in claim 1, wherein said switching means comprises means for receiving a vertical blanking pulse and for prohibiting said color signal modifying apparatus from modifying said color reference signal during the vertical blanking period.

* * * * *